United States Patent [19]

Schuerman et al.

[11] Patent Number: 5,070,531
[45] Date of Patent: Dec. 3, 1991

[54] METHOD OF AND MEANS FOR PROCESSING IMAGE DATA

[75] Inventors: Cornelis P. Schuerman, Munich, Fed. Rep. of Germany; Gadze C. Nauta, Venlo, Netherlands

[73] Assignee: Oce-Nederland B.V., Venlo, Netherlands

[21] Appl. No.: 609,415

[22] Filed: Nov. 5, 1990

[30] Foreign Application Priority Data

Nov. 6, 1989 [NL] Netherlands .................. 8902726

[51] Int. Cl.$^5$ .................................................. G06K 9/36
[52] U.S. Cl. ..................................... 382/49; 382/41; 382/27
[58] Field of Search .................... 382/27, 41, 49; 358/450, 453

[56] References Cited

U.S. PATENT DOCUMENTS

| 4,484,349 | 11/1984 | McCubbrey | 382/49 |
| 4,550,437 | 10/1985 | Kobayashi et al. | 382/27 |
| 4,805,227 | 2/1989 | Wehner | 382/49 |
| 4,908,751 | 3/1990 | Smith | 382/49 |

FOREIGN PATENT DOCUMENTS 0141660 5/1985 European Pat. Off. .
WO8800751 1/1988 PCT Int'l Appl. .

OTHER PUBLICATIONS

"Biomedical Image Processing", S. Sternberg, Computer, vol. 16, Jan. 1983, No. 1, pp. 22-34.

Primary Examiner—Leo H. Boudreau
Assistant Examiner—David Fox

[57] ABSTRACT

The present invention relates to a method and processor for processing data originating from a document, in which data originating from a number of predetermined zones of the document are fed to a processor module and processed per zone, wherein the data are divided up into data groups in accordance with the zones extending over the document in kn rows and kn columns, where k=1, 2, 3 ... etc., with the data of a first row of data groups corresponding to a first row of kn zones being supplied in a first sequence to the n processor modules, the data of a following row of data groups corresponding to a following row of kn zones being supplied in a second sequence to the n processor modules, in such a manner that the data groups of the latter row are offset one group with respect to the sequence of the groups in the first row.

26 Claims, 4 Drawing Sheets

METHOD OF AND MEANS FOR PROCESSING IMAGE DATA

BACKGROUND OF THE INVENTION

1. Field of the Invention

The present invention relates to a method, in an image processing means comprising a number of (n) processor modules, of processing data from a document, in which image data originating from a number of predetermined zones of the document are fed to a processor module and processed per zone. The invention also relates to an image processing apparatus comprising a number of (n) processor modules, each connected to a bit-map memory, for processing data obtained by linewise photoelectric scanning of a document, in which data from a number of predetermined zones of the document are fed to a processor module, stored in part of the bit-map memory and processed per zone.

A method and apparatus of this kind are used for processing data originating from an electronic desktop publishing system or originating from a scanner, in which a document is electrically scanned by means of a CCD-array. The resulting data are processed in an image processing means and then fed to a printing system, e.g. an LED or laser printer. To obtain rapid image processing, the scan signals (or data) are fed to a number of parallel-connected processor modules each provided with a local bit-map memory in which the data are stored, and which can then perform a number of operations on such data, e.g. dithering, fourier transformation, rotation and so on. After these operations, the processed data stored in the bit-map memories are read out and fed to a printer.

2. Description of Related Art

The local bit-map memories of known processors are so arranged that each offers space for data originating from a vertical strip of a document. A number of parallel-connected processor modules are thus able to process an entire document in parallel. An example of this is described in Netherlands Patent Application No. 8801116, which corresponds to U.S. application Ser. No. 07/342,988 filed Apr. 24, 1989.

A method of image processing as known from the prior art will now be described with reference to FIG. 1. A number of (4) processor modules 15–18 are connected to a distribution means 19. A document 26 is fed in the direction of arrow 27 past a CCD array 20. The analog signals obtained are converted via an A/D converter 28 into digital image data and fed via bus 21 to the distribution means 19. The latter distributes the image data in such a manner that data from zone 22 of the document is fed to processor module 15 and stored in local bit-map memory 29. Similarly, data from zone 23 are fed to module 16 and stored in local bit-map memory 30, data from zones 24 and 25, respectively, are fed to modules 17 and 18 and stored in respective local bit-map memories 31 and 32.

The processor module 15 processes the data from local bit-map memory 29 and at the same time the other processor modules perform the same process on data from their local bit-map memories. The processed data are then returned to the local bit-map memories.

For some processing operations, data from other local bit-map memories must also be fed to a specific processor module. This mutual exchange is carried out via a communication channel 33.

The processed data in the local bit-map memories 29–32 are then fed to a printer (not shown) via the processor modules 15–18 and via a second distribution means (not shown).

Since each processor module processes data from a fixed vertical strip of the document, the parallel-connected processor modules are not all subjected to equal loading in the case of data-sensitive operations, such as skeleton generation. A processor module which processes data from the edges of a document, in which there is usually little information (low data density), will carry out its task more quickly than a processor module which processes data from a central strip of the document which has a higher data density. The result of this uneven loading of the processor modules is that the processing time of a document is not optimized.

The process described above with respect to FIG. 1 therefore realizes the following disadvantage. The processor modules 15 and 18 required to process the data from the marginal zones 22 and 25 of the document 26 will frequently have performed these processing operations much faster than the processor modules 16 and 17, so that this disproportionate loading results in a relatively long processing time for the data of the entire document 26.

SUMMARY OF THE INVENTION

The object of the invention is to thus obviate this and other disadvantages concerning uneven loading of processor modules and to provide a method and processor which optimizes processing time.

According to the invention, this object is attained in a method which comprises the following steps: division of the data into data groups in accordance with zones extending over the document in kn rows and kn columns, where k=1, 2, 3, . . . etc., supplying in a first sequence to the n processor modules the data of a first row of data groups corresponding to a first row of kn zones, supplying in a second sequence to the n processor modules data from a following row of data groups corresponding to a following row of kn zones in such a manner that the data groups of this following row are offset one group with respect to the sequence of the groups in the first row.

In an image processing apparatus according to the invention, the data are divided up into data groups in accordance with zones extending over the document in kn rows and kn columns, where k=1, 2, 3, . . . etc., with data of a first row of data groups corresponding to a first row of kn zones being supplied in a first sequence to the n processor modules, the data of a following row of data groups corresponding to a following row of kn zones being supplied in a second sequence to the n processor modules, in such a manner that the data groups of this following row are offset one group with respect to the sequence of the groups in the first row.

Consequently, each processor module processes a substantially diagonal strip (or strips) of a document so that each module realizes equal loading during processing operations and hence minimal processing time is realized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

DETAILED DESCRIPTION OF THE PREFERRED EMBODIMENTS

Figure 2:
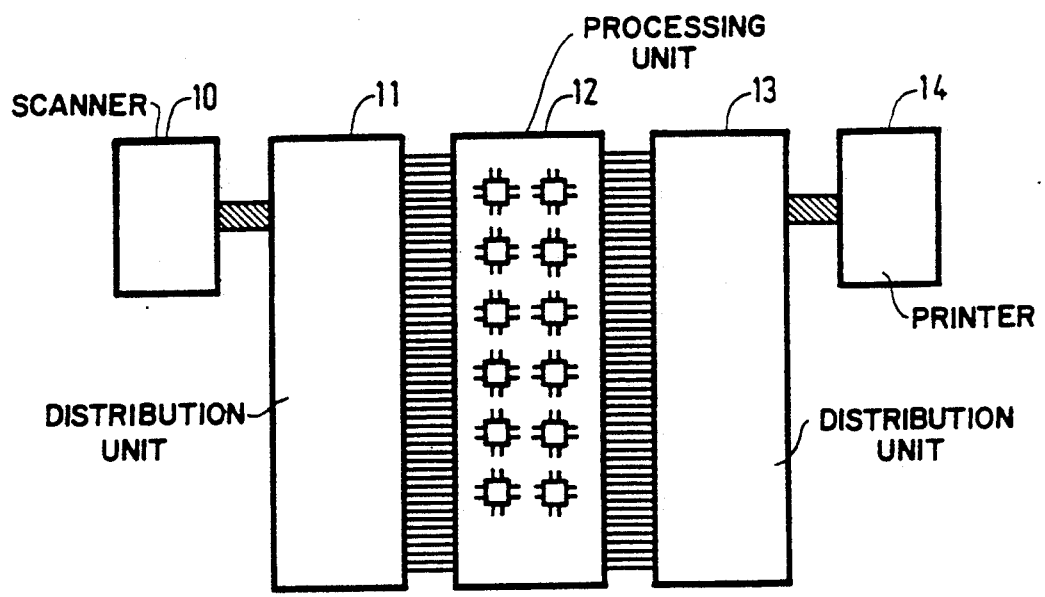
FIG. 2 is a diagram illustrating a scanner printer provided with an image processor.
Figure 1:
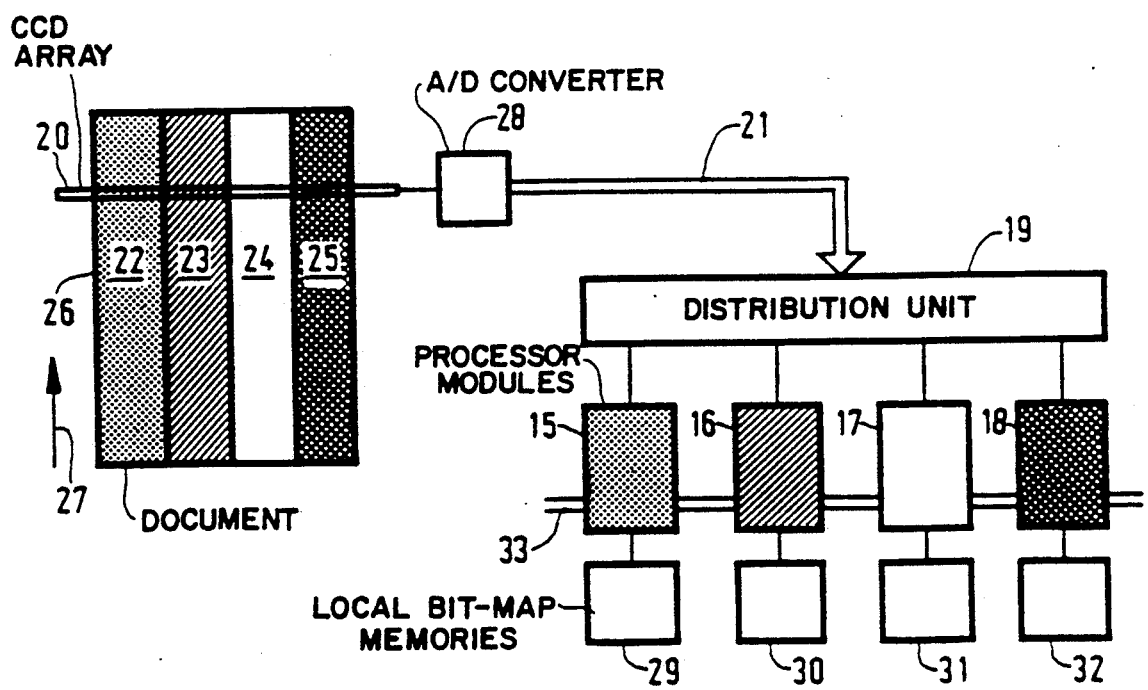
FIG. 1 is a diagram illustrating an image processing means according to the prior art.

FIG. 2 diagrammatically illustrates a scanner 10 in which a document is scanned line by line photoelectrically in a known manner by means of a CCD array. To scan an A-4 original with a resolution of about 20 image dots per mm, the CCD-array contains about 4000 light-sensitive elements. Each image dot (pixel) on the document is thus converted into an analog signal corresponding to the grey value of that image dot. The analog signal is converted by an A/D converter into an 8-bit digital signal for each pixel, and this means that 256 grey values can be reproduced. The digital signals (data) obtained are fed via a number of parallel lines to a distribution means 11 of an image processing means 9 and distributed among a number of processor modules in a processing unit 12, in a manner to be described hereinafter. In processing unit 12, the data are first stored in local bit-map memories associated with the processor modules. The processor modules then perform one or more known operations on such data, such as thresholding, dithering, convolution, histogramming, characteristic extraction from histogram domain, fourier transformation, characteristic extraction from fourier domain, enlargement, reduction, rotation through 90° and so on.

The data processed in this way are then returned to the local bit-map memories and then fed to a printer 14 via a second distribution means 13, in which the data are again put in the correct sequence.

If the printer is a laser printer, a serial data flow will be required, while a parallel data flow is required, for example, for an LED printer.

The method and the image processing means according to the invention will be explained with reference to FIG. 3.

Four processor modules 15-18 are connected to a distribution means 19 and image data from a document 26 fed in the direction of arrow 27 past a CCD array 20 are fed to the distribution means 19 via A/D converter 28 and bus 21. The distribution means 19 so distributes this data that, from a first row 51 of zones, the data group from zone 35 is fed to processor module 15, the data group from zone 36 to module 16, the data group from zone 37 to module 17, and the data group from zone 38 to module 18. The data from the second row 52 of zones are so distributed by the distribution means 19 that the data group from zone 39 is fed to processor module 18, the data group from zone 40 to module 15, the data group from zone 41 to module 16, and the data group from zone 42 to module 17.

The data from the third row 53 of zones are so distributed by the distribution means 19 that the data groups from zones 43, 44, 45 and 46 are fed to processor modules 17, 18, 15 and 16 respectively. The data from the fourth row 54 of zones are so distributed by the distribution means 19 that the data groups from zones 47, 48, 49 and 50 are fed to processor modules 16, 17, 18 and 15 respectively.

In this way, processor module 15 receives data groups from zones 35, 40, 45 and 50 extending diagonally over the document 26. Processor module 16 receives data from zones 36, 41, 46, 47 and so on. With four processor modules, the data are distributed into sixteen data groups corresponding to zones extending on the document in four rows 51 to 54 and four columns 55 to 58. The data from a first row of data groups originating from the first row 51 of the four zones 35, 36, 37 and 38 are fed in a first sequence to the four processor modules (sequence 15, 16, 17, 18). The data from a next row of data groups originating from a next row 52 of four zones 39, 40, 41, 42 are fed in a second sequence to the four processor modules (sequence 18, 15, 16, 17). This row of data groups is offset by one group with respect to the sequence of the data groups originating from the first row 51.

The zones on the document which are fed to one and the same processor module are given the same hatching in FIGS. 3, 4, 6, 7, and 9. The "diagonal" division of the data of a document has the effect that the processing time is substantially equal for each processor module. It should be noted that the sequence of the rows can also be filled in some other way, e.g. by changing over the rows 52 and 53.

Figure 3:
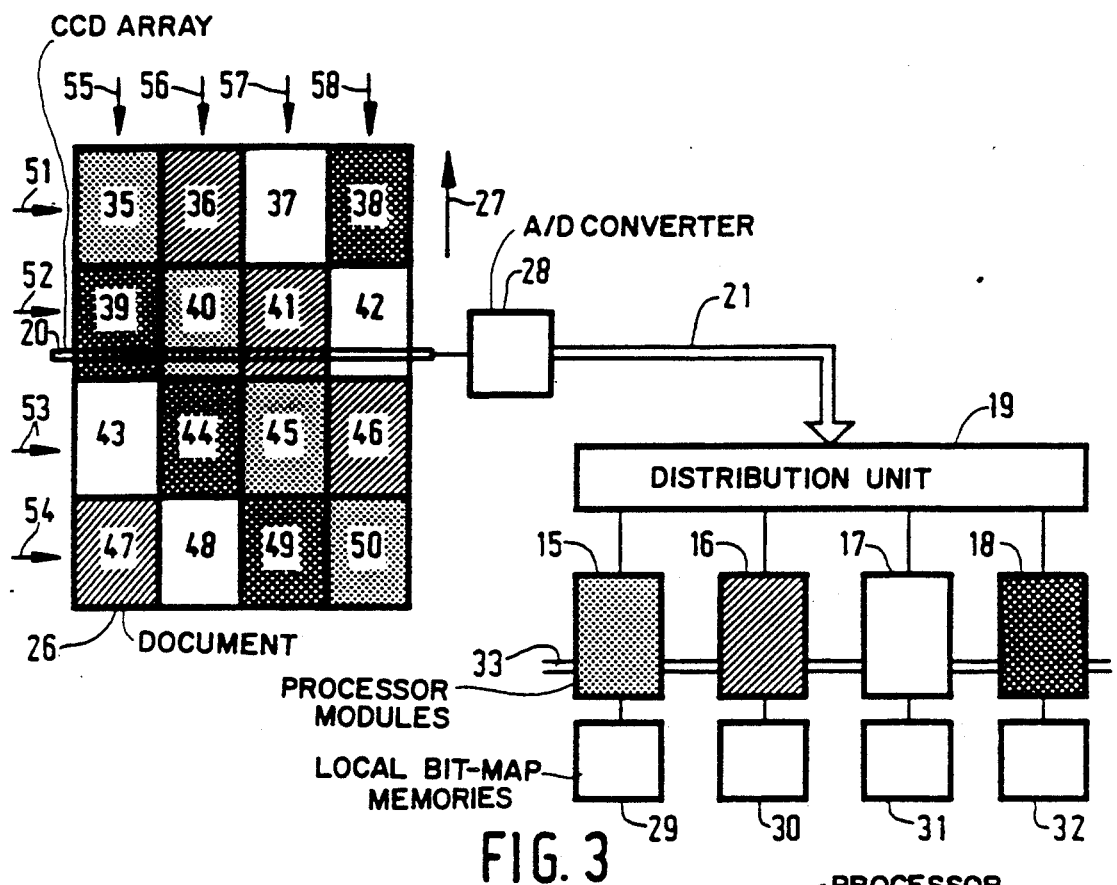
FIG. 3 is a diagram illustrating a method of document division and processing means according to a first embodiment of the invention.
Figure 4:
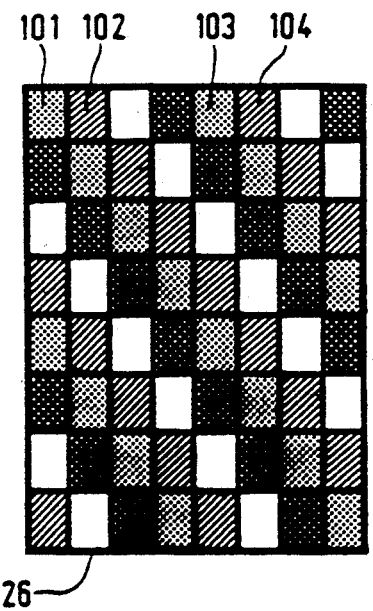
FIG. 4 is a diagram illustrating an alternative method of document division according to a second embodiment of the invention.

In FIG. 4 a document 26 is scanned in a corresponding manner to that in FIG. 3. Here again, the data is distributed over four processor modules. The document is diagrammatically distributed into 8×8 zones, divided over 2×4 rows and 2×4 columns. The hatching indicates the processor module which processes the data group of the associated zone (in accordance with FIG. 3). Thus, in the first row the data of zones 101 and 103 are processed by processor module 15, data from zones 102 and 104 by processor module 16 and so on. Here again, each processor module processes a number of data groups originating from diagonal zones on the document.

Generally, with n processor modules, data from the document is divided into a number of data groups originating from kn rows of zones and kn columns of zones, where k may be any positive integer. In FIG. 3, k=1 and in FIG. 4, k=2. With the data distribution shown in FIG. 4, an even more balanced distribution of the processing operations over the different processor modules is obtained, and the processing times of the different processor modules will constantly approach one another increasingly closely with an increasing value of k.

Figure 9:
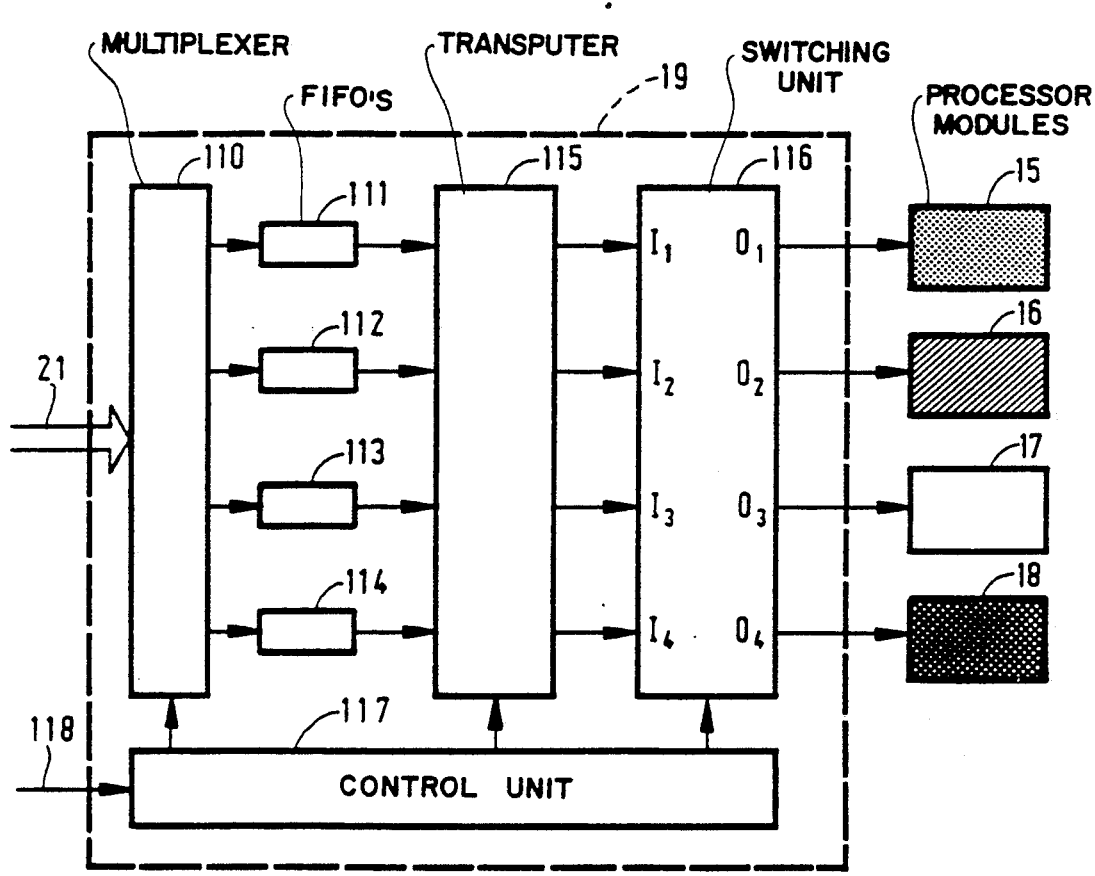
FIG. 9 is a diagram illustrating a distribution means of the invention.

FIG. 9 diagrammatically illustrates a distribution means 19. The digital image data from the scanner are fed via bus 21 to the distribution means 19. The distribution means 19 comprises a link interface of multiplexer 110, first-in first-out (FIFO) shift registers 111-114, transputer 115, switching means 116, and a control unit 117. Assuming that an image line contains 4000 image dots, the data of the first 1000 image dots are fed by means of multiplexer 110 to FIFO 111. Similarly, the data from the next image dots 1001-2000 are fed to FIFO 112, data from image dots 2001-3000 to FIFO 113 and data from image dots 3001-4000 to FIFO 114. Transputer, or parallel processor 115, with four parallel links, is used to read out the data stored in FIFO 111 and feed the same to input $I_1$ of a switching means 116. Similarly, the data in FIFO 112 are fed to input $I_2$, data in FIFO 113 to input $I_3$, and data in FIFO 114 to input $I_4$. The switching means 116 has four inputs $I_1-I_4$ and four outputs $O_1-O_4$. Each of the outputs of the switching means 116 is connected to one of the processor modules 15-18.

Initially, input $I_1$ of switching means 116 is connected to the output $O_1$, $I_2$ to $O_2$, $I_3$ to $O_3$ and $I_4$ to $O_4$. In this way, the data of the first image line scanned is distributed over the four processor modules. Assuming that a document contains 6000 image lines, the switching means is switched to a second state by means of control unit 117 connected to the scanner via a control line 118, after data from 1500 image lines has been fed to the processor modules. In this state, input $I_2$ is connected to output $O_1$, $I_3$ to $O_2$, $I_4$ to $O_3$ and $I_1$ to $O_4$. In this way the data from the image lines 1501-3000 are fed to the processor modules 15-18 in a second sequence. In the case of image line 3001, the control unit 117 switches the switching means 116 into a third state, in which input $I_3$ is connected to output $O_1$, $I_4$ to $O_2$, $I_1$ to $O_3$ and $I_2$ to $O_4$. Starting from image line 4501, the control unit 117 switches switching means 116 into a fourth state in which input $I_4$ is connected to output $O_1$, $I_1$ to $O_2$, $I_2$ to $O_3$ and $I_3$ to $O_4$.

The control unit 117 delivers control signals to the multiplexer 110, transputer 115 and switching means 116. The control line 118 is connected to the scanner, and via this line, the switching means 116 receives, on each new scan line, a pulse fed to a programmable counter means in the switching means 116 in order that the data may at the appropriate times be fed to the processor modules according to the method of the invention.

A crossbar switch IMS C 004 made by Messrs. Inmos is a suitable switching means 116.

The control unit 117 is provided with a program for calculating the different switching times of the switching means 116 and the multiplexer 110 on the basis of input data inputtable via a keyboard not shown. The switching times are dependent on the number of processor modules, the resolution of the scanner, the width and length of the document to be scanned, and the required division of the zones on the document. The offset of the data groups of the different consecutive rows can also be selected as can their distribution over the processor modules.

With the document distribution as shown in FIG. 4, the switching times of the multiplexer 110 are placed at 4000/8=500 pixels and those of the switching means 116 at 6000/8=750 image lines. Thus, in the FIFO 111, for the first image line, the data originating from zone 101 (FIG. 4) and zone 103 are read in, whereafter the switching means 116 transmits the contents of FIFO 111 to processor module 15.

In another embodiment of the distribution mean 19, bus 21 is connected directly to the FIFO's 111-114. The bus 21 is a VME bus system and commands are given via the control unit 117 through the bus system to the FIFOs 111-114, so that these are enabled at the correct times so that each FIFO receives only the data intended for that FIFO.

As already stated, to carry out processing operations on data originating from a specific zone, data from a number of image dots adjoining such a zone are also required. Thus processor module 16 (FIG. 3) will also require data from zones 36, 37, 38, 40, 42, 44, 45 and 46 to process data from zone 41. The data from zones 36 and 46 are already present at processor module 16. The exchange must therefore take place by means of processor module 15 for data from zones 40 and 45, processor module 17 for data from zones 37 and 42, and processor module 18 for data from zones 38 and 44.

With more processor modules (e.g. 7), communication is still required with the direct neighboring processor modules and the directly adjacent processor modules, and therefore with four neighboring processor modules.

Figure 5:
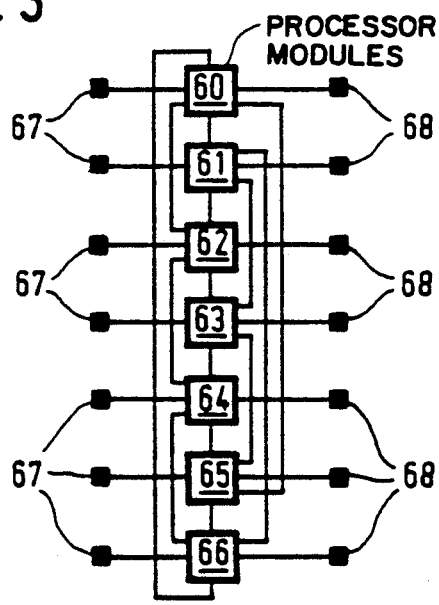
FIG. 5 is a diagram illustrating part of the image processing means according to the invention.
Figure 8:
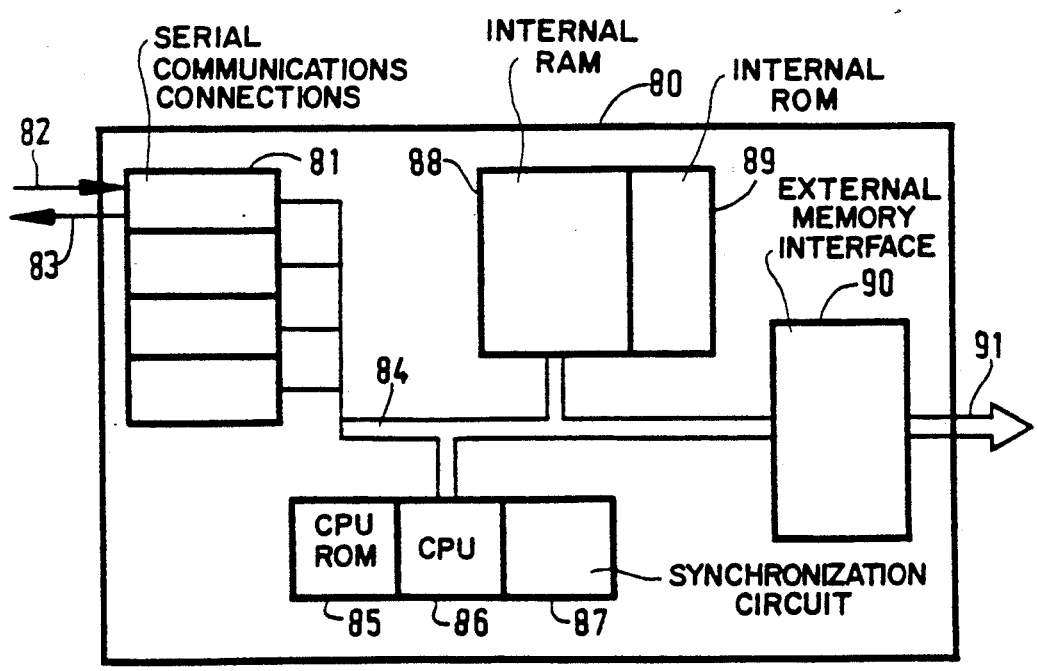
FIG. 8 is a diagram illustrating a parallel processor of the invention.

FIG. 5 shows part of the image processing means according to the invention diagrammatically. The processor modules 60 to 66 each contain at least one processor, or transputer, as described in European Patent Application 0 141 660 of Messrs. Inmos Limited. Each transputer (FIG. 8) comprises a processor with a RAM, and also a number of serial communication connections for external communication. The transputer 80 comprises a CPU 86 having a ROM 85 and is connected via an internal bus system 84 to an external memory interface 90, an internal random access memory 88 and an internal read-only memory 89, and also a number of (4) serial communication connections 81.

Transputer 80 also contains a synchronization circuit 87. The total memory is at least 4 K bytes in size, so CPU 86 can operate without an external memory. The external memory interface 90 is connected via a number of connections 91 to part of a page bit-map system. The processor modules can be interconnected via the serial communication connections 81 to form a network. Each serial communication connection is provided with an input line 82 and an output line 83, which jointly form part of the above-mentioned communication channel.

The operation of a transputer of this kind is described in the said European Patent Application 0 141 660.

The processor modules 60 to 66 (FIG. 5) are interconnected in accordance with a chordal ring structure. For example, processor module 63 is connected to the next neighboring processor modules 62 and 64 and the adjacent processor modules 61 and 65. Each processor module also contains an input connection 67 connected (via the distribution means) to the scanner and an output connection 68 connected (via the second distribution means) to the printer.

Figures 6, 7:
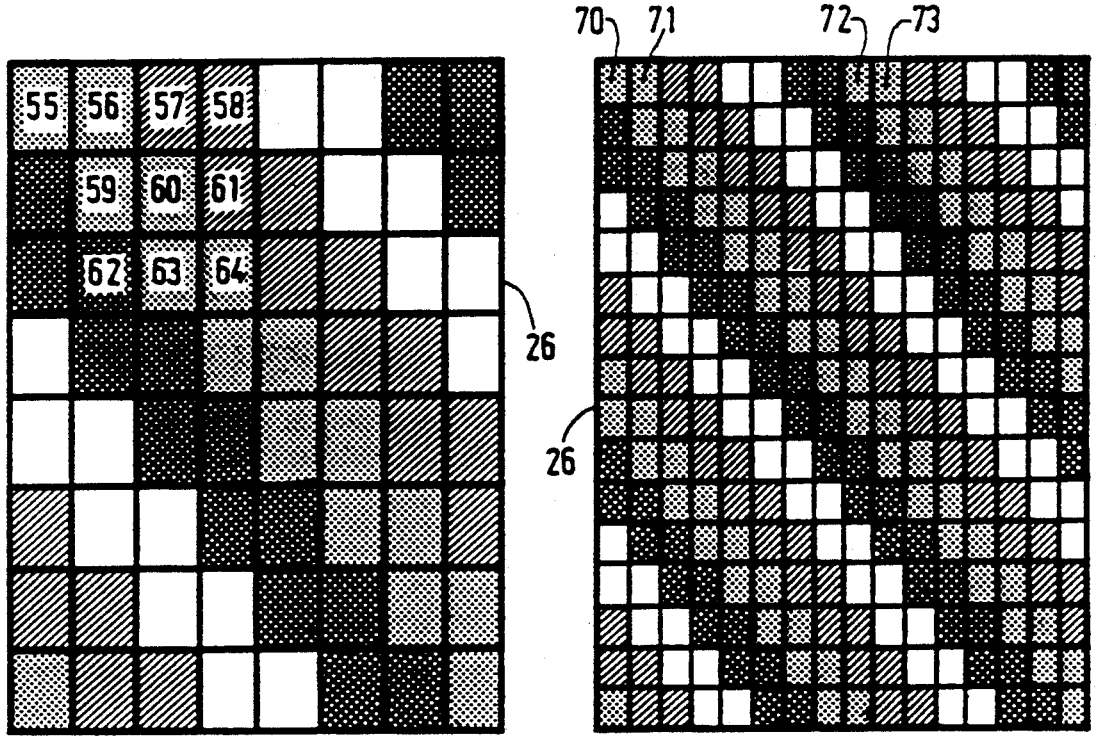
FIG. 6 is a diagram illustrating a method of document division according to another embodiment of the invention.
FIG. 7 is a diagram illustrating a method of document division according to a further embodiment of the invention.

Communication between the modules can be further restricted by a method and image processing means according to the invention as illustrated diagrammatically in FIG. 6. Four processor modules are again used and the hatching again indicates the same modules as used in FIG. 3. The document 26 is (imaginarily) divided into 8×8 zones, 4×2 columns and 4×2 rows (k=2). Processor module 15 processes data from zones 55 and 56, processor module 16 processes data from zones 57 and 58, and so on. For a zone 60 processed by processor module 15, communication is required with zones 56, 57, 58, 59, 61, 62, 63 and 64. The data from zones 56, 59, 63 and 64 are already present at module 15. All that is now required is communication with the next neighboring processor modules: processor module 16 for zones 57, 58 and 61 and processor module 18 for zone 62.

In FIG. 7 the document 26 is divided into 16×16 zones (k=4), processor module 15 processing data from zones 70, 71, 72 and 73 and so on. Here again the sequence of the data groups of a row of zones is always offset by one group with respect to the sequence of the data groups of a preceding row of zones, so that a "diagonal" distribution of the data is obtained over the different processor modules.

The invention is not limited to the above described embodiments. For example, the local bit-map memories can be replaced by a large bit-map memory, in which data from a complete document can be stored, while each processor module has access to the specific locations corresponding to the zones to be processed by that module.

The distribution means may be in a hardware form, but these functions may also be fulfilled by a number of microprocessors or by the processor modules themselves, suitable simple software providing the required data distribution. The processor modules can be so constructed that a separate processor can be used for each image processing function.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In an image processing apparatus comprising n processor modules, a method of processing data from an image, in which data originating from a number of predetermined zones of the image are transferred to respective processor modules and processed per zone, said method comprising the steps of:
    dividing the data of the image into data groups, corresponding to said predetermined zones, of kn rows and kn columns, where k is an integer greater than zero;
    supplying respectively to the n processor modules in a first sequence the data of a first row of data groups corresponding to a first row of kn zones; and
    supplying respectively to the n processor modules in a second sequence the data of a second row of data groups corresponding to a second row of kn zones, the data of data groups of said second row being supplied in said second sequence offset along the row by one data group with respect to said first sequence of said first row of data groups so that processing of data is distributed evenly over the n processor modules.

2. The method of processing data from an image of claim 1, the data of following rows of data groups corresponding to following rows of kn zones each being supplied in respective sequences to the n processor modules which are offset along the row by one data group with respect to a sequence of a preceding row of data groups.

3. An image processing apparatus comprising:
    a photoelectric scanner for scanning the image linewise and for generating scanned data from a number of predetermined zones of the image;
    n processor modules, each coupled to a respective bit-map memory, for processing and subsequently storing said processed scanned data in said respective bit-map memories; and
    distribution means, operatively coupled to said photoelectric scanner and said n processor modules, for
        dividing said scanned data from said photoelectric scanner into data groups, corresponding to said predetermined zones, of kn rows and kn columns, where k is an integer greater than zero,
        supplying scanned data of a first row of data groups corresponding to a first row of kn zones, in a first sequence respectively, to said n processor modules, and
        supplying scanned data of a second row of data groups corresponding to a second row of kn zones, in a second sequence, respectively to said n processor modules,
        said data groups of said second row being supplied in said second sequence offset along the row by one data group with respect to said first sequence of said first row of data groups so that processing of data is distributed evenly among said n processor modules.

4. The image processing apparatus of claim 3, further comprising an analog to digital converter, coupled to said photoelectric scanner, for digitally converting said scanned data.

5. The image processing apparatus of claim 4, said distribution means comprising:
    multiplexer means, coupled to said analog to digital converter, for receiving linewise said digitally converted scanned data and for dividing each line received into data subgroups corresponding to said predetermined zones;
    memory means, coupled to said multiplexer means, for sequentially receiving and storing data subgroups of each line corresponding respectively to said predetermined zones to form said data groups; and
    switching means, coupled to said memory means, for transferring said stored data groups of said first and second rows in said first and second sequences, respectively, to said n processor modules.

6. The image processing apparatus of claim 5, said distribution means further comprising:
    control means, coupled to and receiving from said photoelectric scanner control pulses on a linewise basis, for controlling timing of said multiplexer means, said memory means and said switching means.

7. The image processing apparatus of claim 6, said control means includes a program which controls said timing based upon said control pulses and the number of said n processor modules, the resolution of said photoelectric scanner, the width and length of the image and the number of predetermined zones of the image.

8. The image processing apparatus of claim 6, scanned data of following rows of data groups corresponding to following rows of kn zones each being supplied to said n processor modules in respective sequences offset along the row by one data group with respect to a sequence of an immediately preceding row of data groups.

9. The image processing apparatus of claim 3, said n processor modules are interconnected in a ring.

10. A method of image processing using n processing modules comprising the steps of:

scanning the image linewise with a photoelectric scanner to generate scanned data;

dividing said scanned data into data groups of kn rows and kn columns, where k is an integer greater than zero;

transferring said scanned data of the data groups corresponding to a first row to respective ones of the n processor modules in a first sequence; and transferring said scanned data of the data groups corresponding to a second row to the respective ones of the n processor modules in a second sequence, said second sequence being offset along the row with respect to said first sequence by one data group so that processing of said scanned data is distributed evenly over the n processing modules.

11. A method of image processing of claim 10, further comprising transferring said scanned data of the data groups of each of the following rows to the respective ones of the n processor modules in respective sequences offset along the row by one data group with respect to a sequence of an immediately preceding row.

12. A method of image processing of claim 11, each of the n processor modules processes said scanned data of a respective horizontal portion of the data groups.

13. A method of image processing using n processing modules comprising the steps of:

scanning the image linewise with a photoelectric scanner to generate scanned data dividing said scanned data into data groups of kn columns and kn rows, where k is an integer greater than zero; and transferring said scanned data of the data groups of a row to respective ones of the n processing modules, each row being transferred in a respective sequence which is offset along the row by one data group with respect to a sequence of an immediately preceding row, so that processing of said scanned data is distributed evenly over the n processing modules.

14. In a processing apparatus comprising n processor modules, a method of processing data from a printed document, in which data originating from a number of predetermined zones of the printed document are transferred to respective processor modules and processed per zone, central zones of the printed document being of greater data density than marginal zones, said method comprising the steps of:

dividing the data of the printed document into data groups, corresponding to said predetermined zones, of kn rows and kn columns, where k is an integer greater than zero;

supplying respectively to the n processor modules in a first sequence the data of a first row of data groups corresponding to a first row of kn zones; and supplying respectively to the n processor modules in a second sequence the data of a second row of data groups corresponding to a second row of kn zones, the data of data groups of said second row being supplied in said second sequence offset along the row by one data group with respect to said first sequence of said first row of data groups so that processing of data is distributed evenly over the n processor modules.

15. The method of processing data from a printed document of claim 14, the data of following rows of data groups corresponding to following rows of kn zones each being supplied in respective sequences to the n processor modules which are offset along the row by one data group with respect to a sequence of a preceding row of data groups.

16. A processing apparatus for a printed document comprising:

a photoelectric scanner for scanning the printed document linewise and for generating scanned data from a number of predetermined zones of the printed document, central zones of the printed document being of greater data density than marginal zones;

n processor modules, each coupled to a respective bit-map memory, for processing and subsequently storing said processed scanned data in said respective bit-map memories; and distribution means, operatively coupled to said photoelectric scanner and said n processor modules, for dividing said scanned data from said photoelectric scanner into data groups, corresponding to said predetermined zones, of kn rows and kn columns, where k is an integer greater than zero, supplying scanned data of a first row of data groups corresponding to a first row of kn zones, in a first sequence respectively, to said n processor modules, and supplying scanned data of a second row of data groups corresponding to a second row of kn zones, in a second sequence; respectively to said n processor modules, said data groups of said second row being supplied in said second sequence offset along the row by one data group with respect to said first sequence of said first row of data groups so that processing of data is distributed evenly among said n processor modules.

17. The processing apparatus of claim 16, further comprising an analog to digital converter, coupled to said photoelectric scanner, for digitally converting said scanned data.

18. The processing apparatus of claim 16, said distribution means comprising:

multiplexer means, coupled to said analog to digital converter, for receiving linewise said digitally converted scanned data and for dividing each line received into data subgroups corresponding to said predetermined zones;

memory means, coupled to said multiplexer means, for sequentially receiving and storing data subgroups of each line corresponding respectively to said predetermined zones to form said groups; and switching means, coupled to said memory means, for transferring said stored data groups of said first and second rows in said first and second sequences, respectively, to said n processor modules.

19. The processing apparatus of claim 18, said distribution means further comprising:

control means, coupled to and receiving from said photoelectric scanner control pulses on a linewise basis, for controlling timing of said multiplexer means, said memory means and said switching means.

20. The processing apparatus of claim 19, said control means includes a program which controls said timing based upon said control pulses and the number of said n processor modules, the resolution of said photoelectric scanner, the width and length of the printed document and the number of predetermined zones of the printed document.

21. The processing apparatus of claim 19, scanned data of following rows of data groups corresponding to following rows of kn zones each being supplied to said n processor modules in respective sequences offset along the row by one data group with respect to a sequence of an immediately preceding row of data groups.

22. The processing apparatus of claim 16, said n processor modules are interconnected in a ring.

23. A method of processing a printed document of predetermined zones using n processing modules, central zones of the printed document being of greater data density than marginal zones, comprising the steps of:
scanning the printed document linewise with a photoelectric scanner to generate scanned data;
dividing said scanned data into data groups, corresponding to the predetermined zones, of kn rows and kn columns, where k is an integer greater than zero;
transferring said scanned data of the data groups corresponding to a first row to respective ones of the n processor modules in a first sequence; and
transferring said scanned data of the data groups corresponding to a second row to the respective ones of the n processor modules in a second sequence,
said second sequence being offset along the row with respect to said first sequence by one data group so processing of said scanned data is distributed evenly over the n processing modules.

24. A method of processing of claim 23, further comprising transferring said scanned data of the data groups of each of the following rows to the respective ones of the n processor modules in respective sequences offset along the row by one data group with respect to a sequence of an immediately preceding row.

25. A method of processing of claim 24, each of the n processor modules processes the scanned data of a respective horizontal portion of the data groups.

26. A method of processing a printed document of predetermined zones using n processing modules, central zones of the printed document being of greater density data than marginal zones, comprising the steps of:
scanning the printed document linewise with a photoelectric scanner to generate scanned data;
dividing said scanned data into data groups, corresponding to the predetermined zones, of kn columns and kn rows, where k is an integer greater than zero; and
transferring said scanned data of the data groups of a row to respective ones of the n processing modules, each row being transferred in a respective sequence which is offset along the row by one data group with respect to a sequence of an immediately preceding row, so that processing of said scanned data is distributed evenly over the n processing modules.

* * * * *